United States Patent [19]
Ikeda et al.

[11] Patent Number: 5,167,574
[45] Date of Patent: Dec. 1, 1992

[54] VENTILATION SYSTEM

[75] Inventors: Kazutoshi Ikeda, Okazaki; Tetsumi Ichioka, Mie; Tetsuya Miyano, Inazawa; Yoshihiro Menjo, Chiryu, all of Japan

[73] Assignee: Toyoda Gosei Co. Ltd., Nishikasugai, Japan

[21] Appl. No.: 663,622

[22] Filed: Mar. 4, 1991

[30] Foreign Application Priority Data

| Mar. 6, 1990 | [JP] | Japan | 2-54240 |
| May 15, 1990 | [JP] | Japan | 2-124578 |
| Aug. 29, 1990 | [JP] | Japan | 2-229433 |
| Aug. 29, 1990 | [JP] | Japan | 2-229434 |
| Aug. 29, 1990 | [JP] | Japan | 2-229440 |
| Aug. 29, 1990 | [JP] | Japan | 2-229441 |

[51] Int. Cl.⁵ ............................................ B60H 1/26
[52] U.S. Cl. ............................... 454/164; 137/512.1; 454/904
[58] Field of Search .................. 98/2.18, DIG. 8; 137/855, 512.1, 843; 251/65

[56] References Cited

U.S. PATENT DOCUMENTS

| 2,739,521 | 3/1956 | Spear | 98/DIG. 6 X |
| 2,849,941 | 9/1958 | Negoro | 98/2.18 X |
| 3,891,000 | 6/1975 | Melnick | 251/65 X |
| 4,512,934 | 4/1985 | Bucher | 251/65 X |

FOREIGN PATENT DOCUMENTS

| 0037553 | 10/1981 | European Pat. Off. . |
| 0326301 | 8/1989 | European Pat. Off. . |
| 59-63221 | 4/1984 | Japan . |
| 62-9130 | 3/1987 | Japan . |

Primary Examiner—Harold Joyce
Attorney, Agent, or Firm—Cushman, Darby & Cushman

[57] ABSTRACT

A ventilation system for ventilating the inside of a compartment such as the compartment of an automobile or the room of a building. The ventilation system prevents the contaminated outside air from flowing back into the inside of the compartment from an inside air outlet by magnetically attracting a mouth frame, which is composed of the inside air outlet and a peripheral edge, and a one-way valve for opening the inside air outlet only at the time of releasing the inside air of the compartment to the outside.

4 Claims, 13 Drawing Sheets

FIG. 1
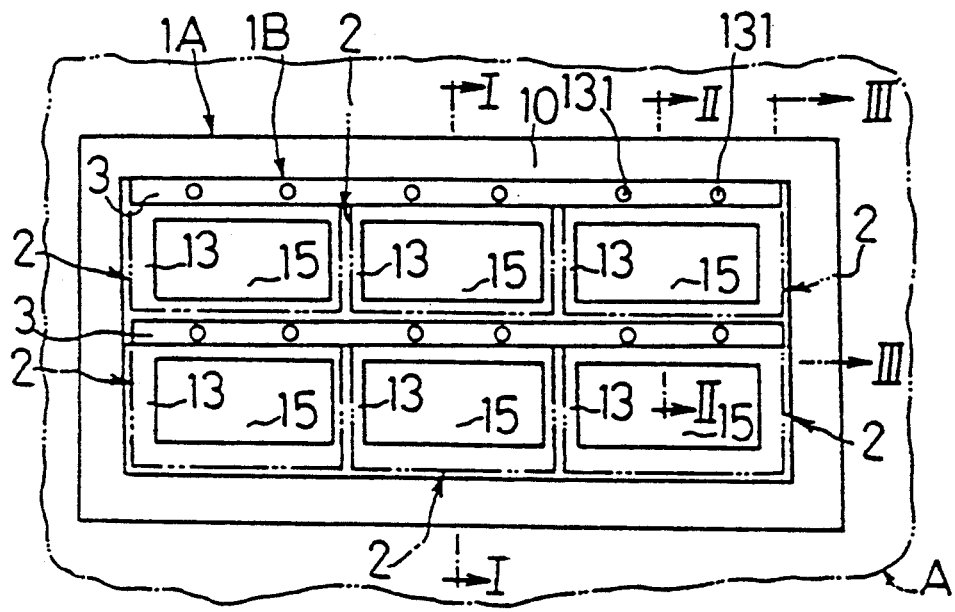
FIG. 2
FIG. 3
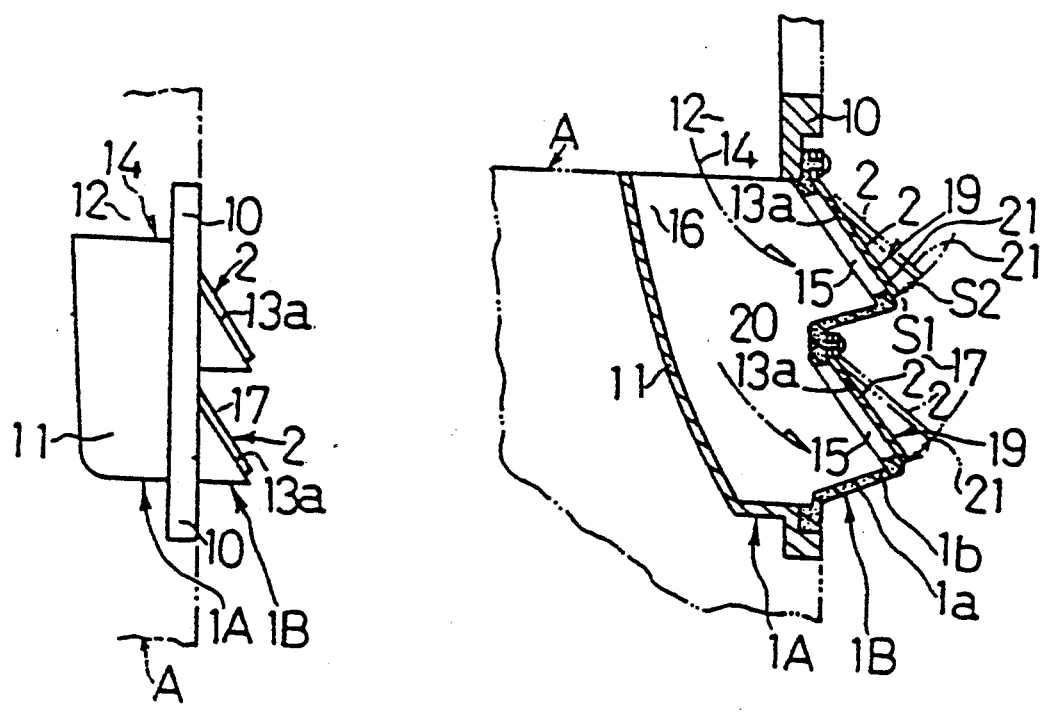

VENTILATION SYSTEM

BACKGROUND OF THE INVENTION

The present invention relates to a ventilation system for ventilating the inside of the compartment of an automobile or building and, more particularly, to an improvement in an inside air releasing system for releasing the contaminated air in the compartment (as will be called the "inside air") to the outside.

One ventilation system of the prior art is constructed, as disclosed in Japanese Utility Model Publication No. Sho 62-9130 or Japanese Patent Laid-Open No. Sho 59-63221, of: a mouth frame having an inside air outlet for releasing the inside air to the outside of a compartment; and a one-way valve adapted to come into abutment against the peripheral edge of said inside air outlet acting as a valve seat, at times other than the time of releasing the inside air to the outside, thereby to close said inside air outlet and apart from said valve seat, at the time of releasing the inside air to the outside, thereby to open said inside air outlet in the releasing direction only.

This one-way valve is formed into a reed larger than said inside air outlet and arranged on the outer side of said mouth frame. The upper end of the one-way valve is attached just above the inside air outlet so that its substantial entirety excepting said upper end can swing on said attached portion. And, the one-way valve is brought by its own weight into abutment against the peripheral edge of the inside air outlet at times other than the time of releasing the inside air to the outside thereby to close the inside air outlet. When, however, the pressure difference (which is caused by a vacuum generated on the surface of a car body at the running time and acted upon the one-way valve) between the inside and outside of the compartment exceeds the weight of the one-way valve, the one-way valve is swung apart from the peripheral edge of the inside air outlet to the outside to open the inside air outlet only in the direction to release the inside air to the outside.

The ventilation system thus constructed is mounted for use on the car, for example. Since the compartment of the car is relatively small and is liable to be contaminated with the smoke of cigarette and the breathing of the passengers, the ventilation system is required to have a performance to release the inside air quickly to the outside. In the prior art, therefore, the one-way valve has its thickness and accordingly its weight reduced so that it can open the aforementioned inside air outlet even under a small pressure difference thereby to release the contaminated inside air efficiently.

If, however, the one-way valve is thinned to become lighter as in the prior art, the force to bring it into abutment against the valve seat for closing the inside air outlet is reduced, and its edge become liable to be deformed. As a result, a clearance is established between the one-way valve and the valve seat, thus causing a defect that the sealing properties of the inside air outlet are deteriorated. Since, moreover, the one-way valve is liable to bound, if light, under the influences of the vibrations at the running time of the car, it may open the inside air outlet widely. If the inside air outlet thus has its sealing properties deteriorated or is uselessly opened, the outside contaminated air containing sand, dust, smoke and/or a bad smell (as will be called the "outside air") may flow back from the inside air outlet into the car compartment to make the passenger uncomfortable. This has also been a problem to be solved in the prior art. This back-flow phenomena prominently occur especially when the car runs on a place with a cloud of sand. Thus, numerous car users have desired such a ventilation system as can close the aforementioned inside air outlet in a reliably sealed state.

SUMMARY OF THE INVENTION

An object of the present invention is to solve the above-specified problems and to provide a novel ventilation system which can keep the inside air outlet sealed up without fail with the one-way valve at times other than the time of releasing the inside air to the outside thereby to preventing the back-flow of the contaminated outside air from the inside air outlet into the compartment.

In order to achieve the above-specified object, A ventilation system according to the present invention comprises:

a mouth frame including an inside air outlet for releasing the inside air of a compartment to the outside, and either permanent magnet means or magnetically attractive means disposed in at least the peripheral edge of said inside air outlet, said permanent magnet means being adapted to have a function as a permanent magnet, and said magnetically attractive means being adapted to have a function to be magnetically attracted by a permanent magnet; and a one-way valve for closing said inside air outlet at times other than the time of releasing the inside air of the compartment to the outside, and for opening said inside air outlet only in said releasing direction at the time of releasing the inside air of said compartment to the outside, said one-way valve including either permanent magnet means or magnetically attractive means disposed in at least its portion to abut against the peripheral edge of said inside air outlet, said permanent magnet means being adapted to have a function as a permanent magnet, and said magnetically attractive means having a function to be magnetically attracted by a permanent magnet.

Other objects of the present invention will become apparent if the modes of embodiments to be described hereinafter are understood, as will be explicitly defined in the appended Claims. Moreover, numerous advantages left untouched herein will occur to those skilled in the art if the present invention is put into practice.

BRIEF DESCRIPTION OF THE DRAWINGS

FIG. 1 is a front elevation showing an essential portion of a ventilation system according to a first embodiment of the present invention;

FIG. 2 is a side elevation of FIG. 1;

FIG. 3 is a section taken along line III—III of FIG. 1;

DETAILED DESCRIPTION OF THE PREFERRED EMBODIMENTS

Figure 4:
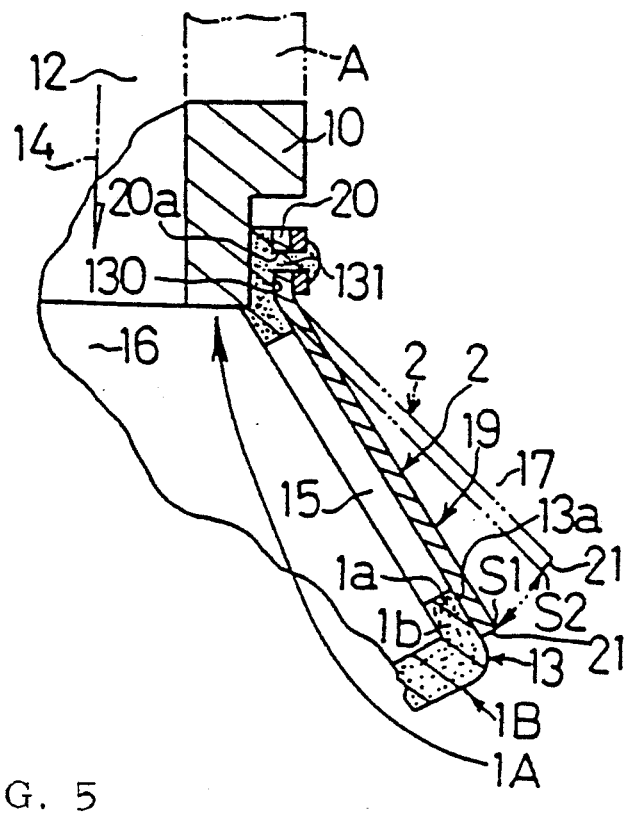
FIG. 4 is a section taken along line IV—IV of FIG. 1.

Six embodiments, which are embodied by the present invention into ventilation systems to be mounted for use on the body of an automobile, will be consecutively described in the following with reference to the accompanying drawings.

First of all, the ventilation system according to the first embodiment is constructed, as shown in FIGS. 1 to 6, of: an inside air introducing duct 1A for sucking the inside air 14 of the compartment 12 of a car to introduce it to an inside air outlet 15; a mouth frame 1B having six inside air outlets 15 for releasing the inside air 14 to the outside 17 and peripheral edges 13 of the outlets 15; six one-way valves 2 so attached to the mouth frames 1B as to open the aforementioned inside air outlets 15 only at the time of releasing the inside air 14 to the outside 17; and members or structures for attaching those members to one another. Moreover, the mouth frame 1B is equipped with magnetically attractive means having a function to be magnetically attracted by a permanent magnet, and the one-way valve 2 is equipped with permanent magnet means having a function as a permanent magnet. These structural elements will be detailed in the following.

The inside air introducing duct 1A is composed of a flange base 10 to be mounted on the body A of the car, and a generally vertically extending cylindrical portion 11 formed integrally with the flange base 10. The inside air introducing duct 1A thus composed is molded of a resin such as polyamide or polypropyrene. The cylindrical portion 11 is equipped at its one upper end with an inside air inlet 16, into which the inside air 14 of the compartment 12 is to flow, and sideways at its other end with a mounting portion 16a for mounting the mouth frame 1B.

This mouth frame 1B is molded of a magnetically attractive molding material of a resin 1b such as the polyamide or polypropyrene which contains 30 to 60 wt % of magnetically attractive powder 1a made of Soft Ferrite (which is produced by Dai Nippon Ink & Chemical Inc.) and having a particle diameter of 60 to 80 $\mu$m. In other words, this magnetically attractive material makes the magnetically attractive means. The mouth frame 1B is formed with a total of six, i.e., two vertically steps and three horizontally inside air outlets 15 communicating with the aforementioned inside air inlet 16 for releasing the inside air 14 to the outside 17. Each of the inside air outlets 15 is formed therearound with the peripheral edge 13 which has its wall inclined at about 60 degrees. A vertical wall 130 is extended from the upper end of the peripheral edge 13 and formed with a plurality of mounting projections 131 for mounting the one-way valve 2, as will be described hereinafter. On the other hand, the peripheral edge 13 is formed at its four sides enclosing the inside air outlet 15, i.e., its upper, lower, lefthand and righthand sides with a valve seat 13a, against which the one-way valve 2 is to be brought into or away from abutment.

Each of the six one-way valves 2 is made of a plate-shaped rubber magnet which has an area larger than the opening area of each of the aforementioned inside air outlets 15 and has a thickness of about 0.5 mm. This rubber magnet is molded of rubber such as chloroprene rubber which contains 10 to 60 vol. % of permanent magnet powder such as Hard Ferrite (produced under the trade No. FS-317 by Toda Industrial Co., Ltd.) having a particle diameter of 60 to 80 $\mu$m. In short, this rubber magnet makes the permanent magnet means. The rubber magnet is magnetized at a pitch of about 5 mm to have a magnetic force of 50 to 200 Gausses. As a result, the force, by which the rubber magnet attracts the magnetically attractive means of the aforementioned mouth frame 1B magnetically, is set to 0.2 to 7 g/cm$^2$. Moreover, the one-way valve 2 has a specific weight of 1.5 to 3.0.

The one-way valve 2 is formed at its plate-shaped one end 20 with a plurality of mounting holes 20a for fitting therein the mounting projections 131 of the aforementioned peripheral edge 13. The one-way valve 2 thus made is arranged to cover the corresponding inside air outlet 15 from the outside 17 of the compartment. Specifically, the one end 20 of the one-way valve 2 has its mounting holes 20a fitted on the mounting projections 131 of the peripheral edge 13 of the corresponding inside air outlet 15, and the mounting holes 30 of a retainer 3 made of a synthetic resin are then fitted on the aforementioned mounting projections 131. After this, the crests of the mounting projections 131 are heated and melted so that they are fused to the retainer 3. Then, the one end 20 of the one-way valve 2 is fixed on the vertical wall 130 of the mouth frame 1B. Thus, the one-way valve 2 has its one end 20 so retained on the vertical wall 130, which merges into the inclined wall forming the aforementioned inside air outlet 15, that it may open the inside air outlet 15 only when the inside air 14 is to be released from the inside 12 of the compartment to the outside 17.

Figure 5:
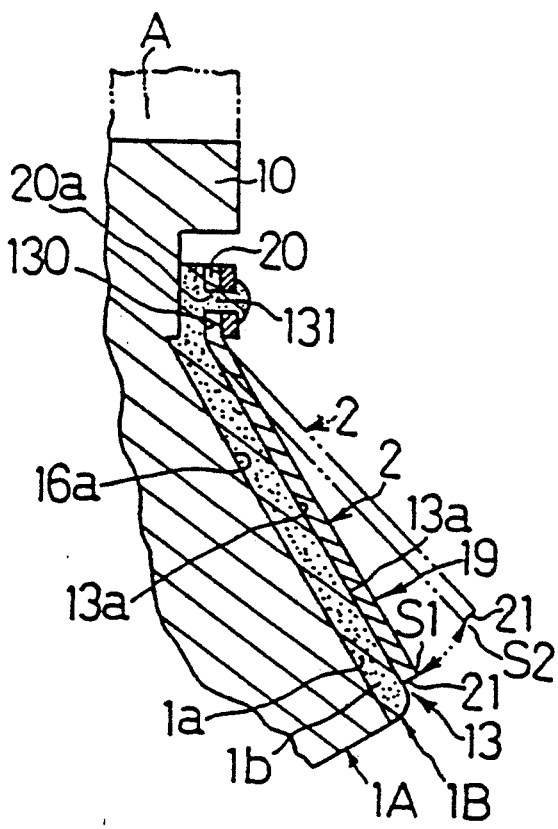
FIG. 5 is a section taken along line VI—VI of FIG. 1.
Figure 6:
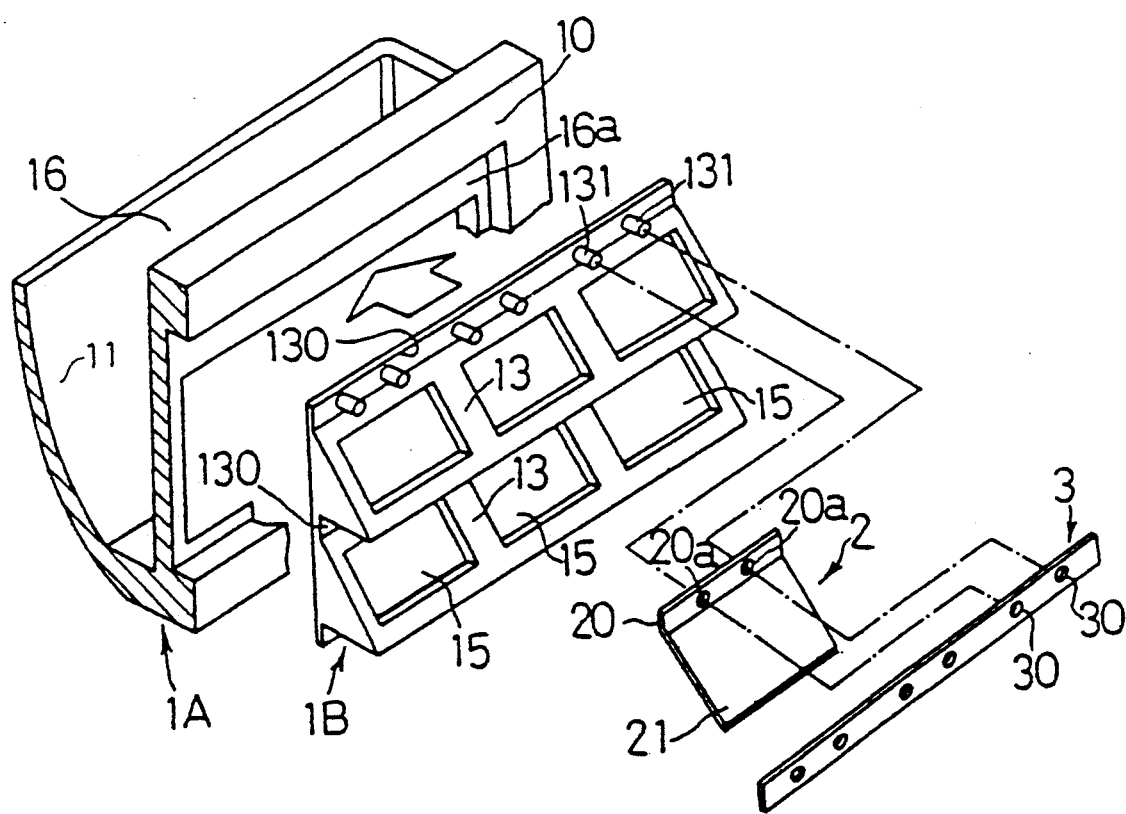
FIG. 6 is an exploded perspective view showing the ventilation system of the first embodiment.
Figure 7:
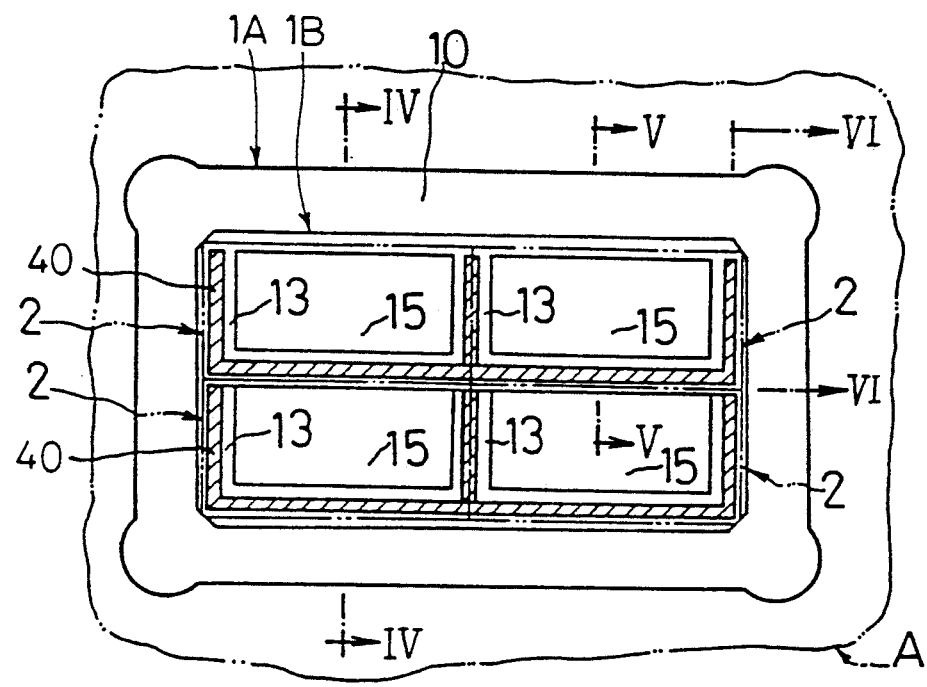
FIG. 7 is a front elevation showing an essential portion of a ventilation system according to a second embodiment of the present invention.
Figure 8:
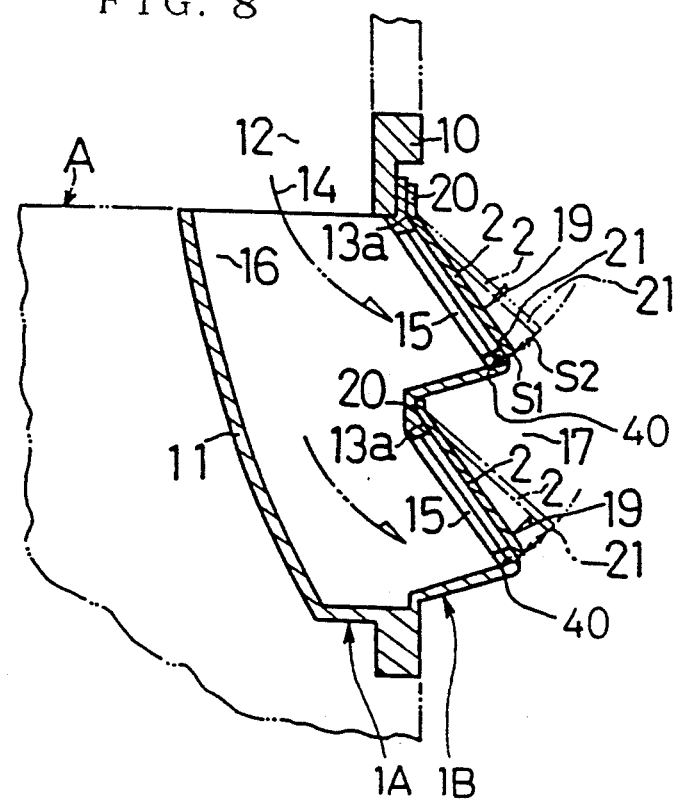
FIG. 8 is a section taken along line VIII—VIII of FIG. 7.
Figure 9:
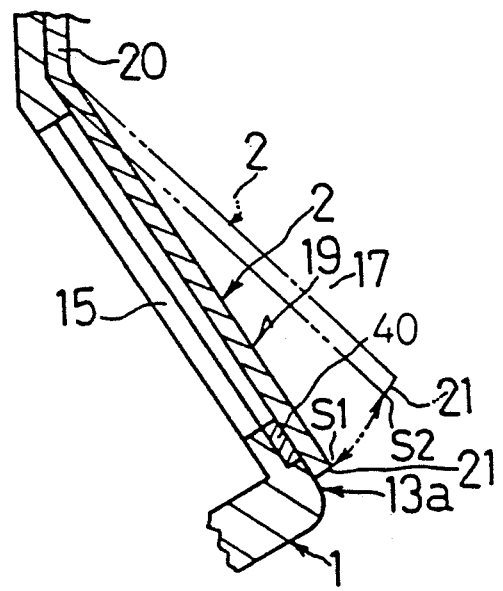
FIG. 9 is a section taken along line IX—IX of FIG. 7.
Figure 10:
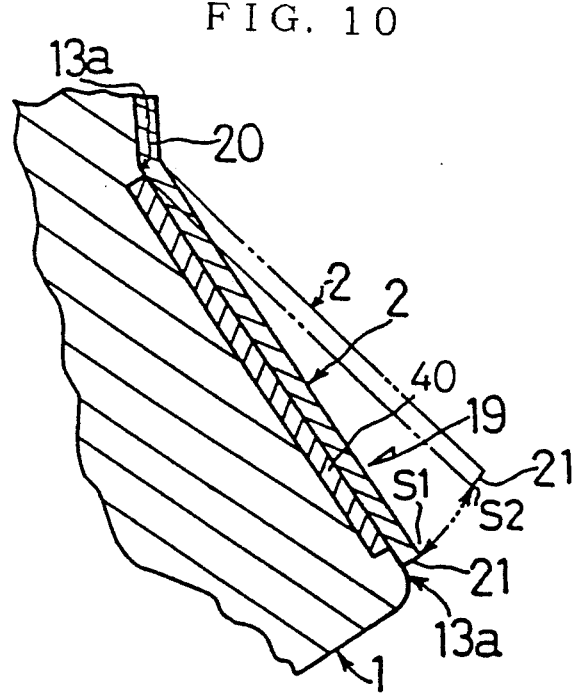
FIG. 10 is a section taken along line X—X of FIG. 7.

The one-way valve 2 can have its other end 21 swung on its one end 20 to and into abutment against the corresponding valve seat 13a, namely, in a direction to close the corresponding inside air outlet 15 (as indicated by arrow S1 in FIGS. 4 and 5). On the other hand, the one-way valve 2 has its rubber magnet attracted to the valve seat 13a by the magnetic force to close the corresponding inside air outlet 15 without fail. When the pressure difference (to act upon the one-way valve) between the inside 12 and the outside 17 is increased to exceed both the action (or magnetically attracting force) of the aforementioned magnetic force and the weight of the one-way valve 2, the other end 21 of the one-way valve 2 can be swung on the one end 20 apart from the valve seat 13a enclosing the inside air outlet 15 and in a direction to open the inside air outlet 15 (as indicated by arrow S2). In these ways, the mouth frame 1B having the six one-way valves 2 is fixedly held on the mounting portion 16a of the duct body 1A, as shown in FIG. 4. Incidentally, the drag to be involved in the aforementioned swinging motions can be reduced by making the one end or fulcrum 20 thinner than the other portions.

The ventilation system thus constructed according to the embodiment has its one-way valve 2 attracted to and held in tight contact with the valve seat 13a without fail by the magnetically attractive force of the rubber magnet when the one-way valve 2 closes the inside air outlet 15. As a result, any clearance will neither be established between the one-way valve 2 and the peripheral edge 13, nor will the inside air outlet 15 be opened by the vibrations at the running time of the car, even if the one-way valve 2 is made thin. Thus, the ventilation system can block the contaminated outside air containing sand, dust smoke and/or a bad smell from the inside 12.

In case the inside air 14 is contaminated with the smoke of cigarette in the inside 12, the one-way valve 2 overcomes the magnetic force of the aforementioned magnet and its own weight and is swung by the action of the pressure difference (or vacuum) in the direction to open the inside air outlet 15 so that it can release the contaminated inside air 14 coming from the inside air inlet 16 to the outside 17 via the inside air outlet 15.

Since the four sides, i.e., the upper, lower, lefthand and righthand sides of the peripheral edge 13 enclosing the inside air outlet 15 are formed with the valve seat 13a made of a synthetic resin containing the magnetically attractive powder, the one-way valve 2 made of the plate-shaped rubber magnet is attracted in tight contact with the whole peripheral edge of the valve seat 13a, when abutting against the valve seat 13a, to establish no clearance thereby to provide high sealing properties, even if it is made thin. Since, moreover, the one-way valve 2 is made thin, it experiences less shocks at the time of abutting against the valve seat 13a so that it can prevent noises from being generated.

Next, in the ventilation system according to the second embodiment, as shown in FIGS. 7 to 10, a magnetically attractive member 40 made of a " -shaped" thin foil of ferrite stainless steel (e.g., SUS430MT according to Japanese Industrial Standards) is inserted in the lower, lefthand and righthand sides (excepting the upper side) of the four sides of the peripheral edge 13 of the inside air outlet 15 of the mouth frame 1B. In short, this magnetically attractive member 40 makes the magnetically attractive means.

On the other hand, the structure of the first embodiment is commonly applied to that of the second embodiment, in which the rubber magnet forming the oneway valve 2 makes the permanent magnet means. Incidentally, the remaining structure is similar to that of the first embodiment, and the repetition of description will be omitted by designating the parts of FIGS. 7 to 10 at the common reference numerals of the first embodiment.

Figure 11:
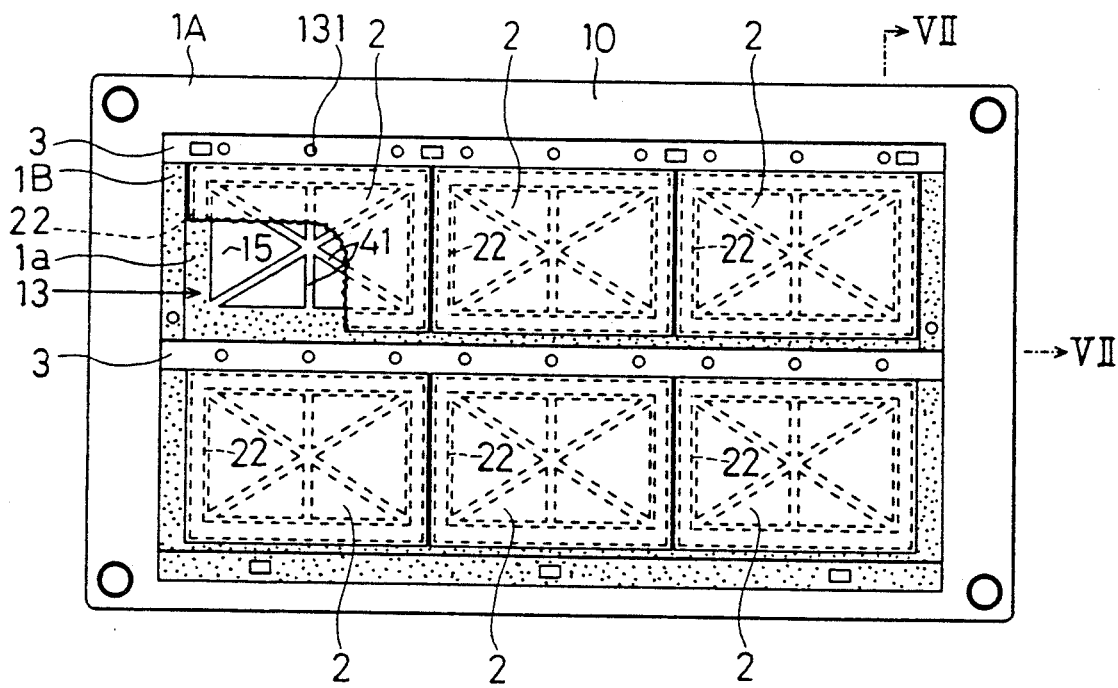
FIG. 11 is a front elevation showing a ventilation system according to a third embodiment of the present invention.
Figure 12:
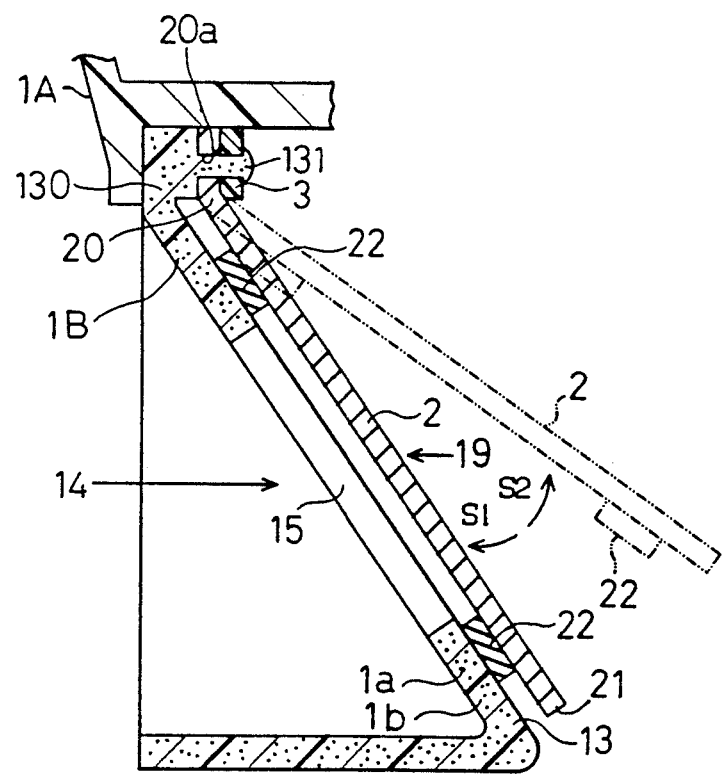
FIG. 12 is a section taken along XI—XI of FIG. 11.
Figure 13:
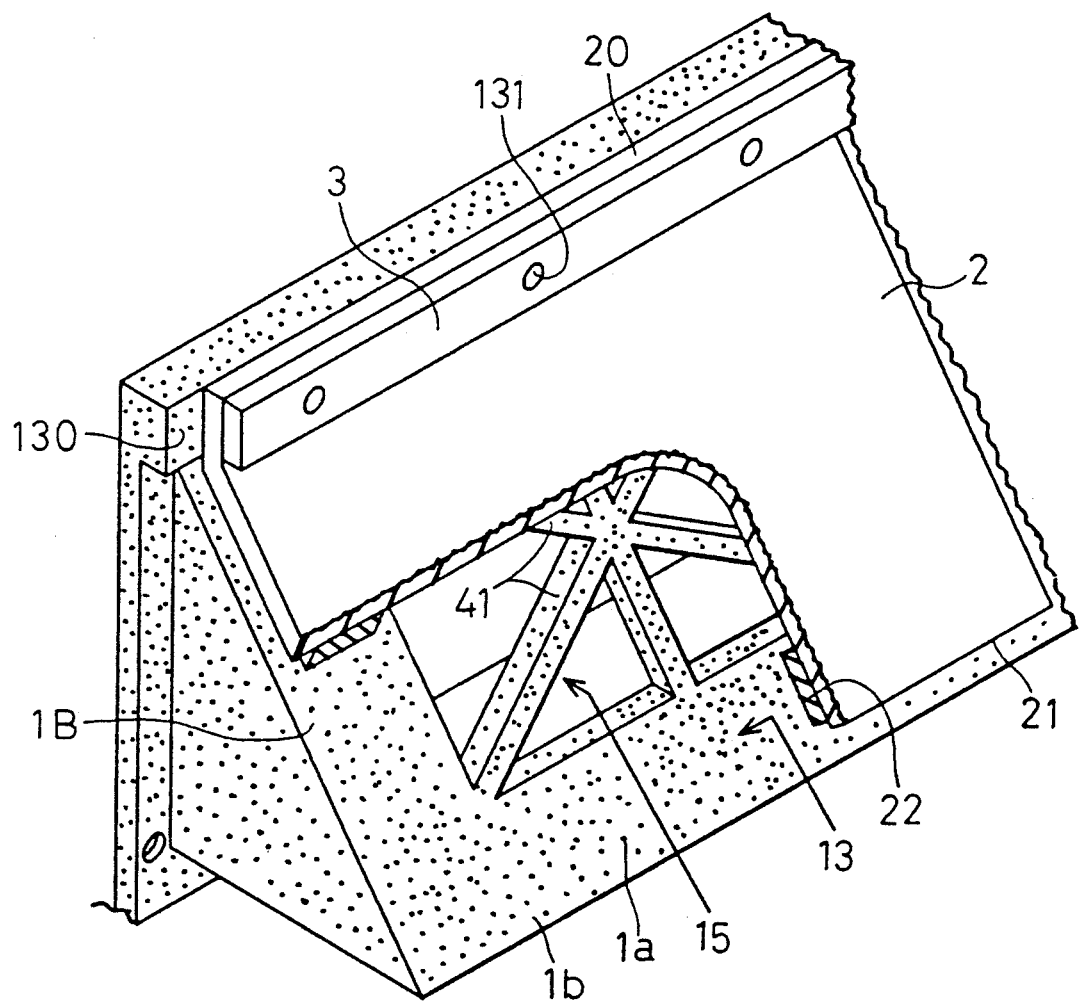
FIG. 13 is a perspective view showing an essential portion of the ventilation system of the third embodiment.

Next, the ventilation system of the third embodiment, as shown in FIGS. 11 to 13, is similar to that of the first embodiment in that the magnetically attractive materials forming the mouth frame 1B make the magnetically attractive means. Despite of this similarity, however, a plurality of cross members 41 are molded integrally with the peripheral edge 13 between the diagonally corners of each inside air outlet 15 and between the centers of the upper and lower sides of the inside air outlet 15. These cross members 41 cross each other at the central portion of the inside air outlet 15 so that they are integrated. When the one-way valve 2 abuts against the peripheral edge 13, it also abuts against the corresponding cross member 41 so that it can be prevented from being deformed to bit into the corresponding inside air outlet 15.

On the other hand, the one-way valve 2 is molded of rubber such as chloroprene rubber. To that portion of the one-way valve 2, at which it abuts against the aforementioned peripheral edge 13, there is adhered by means of an adhesive a rectangularly framed permanent magnet member 22 which is made of barium ferrite, for example, to have a thickness of about 5 mm. In short, this permanent magnet member 22 makes the permanent magnet means. The permanent magnet member 22 is adhered to the inside face of the one-way valve 2, as shown, but may be adhered to the outside face. The remaining structure is similar to that of the first embodiment, and the repetition of description will be omitted by designating the parts of FIGS. 11 to 13 at the same reference numerals as those of the first embodiment.

Figure 14:
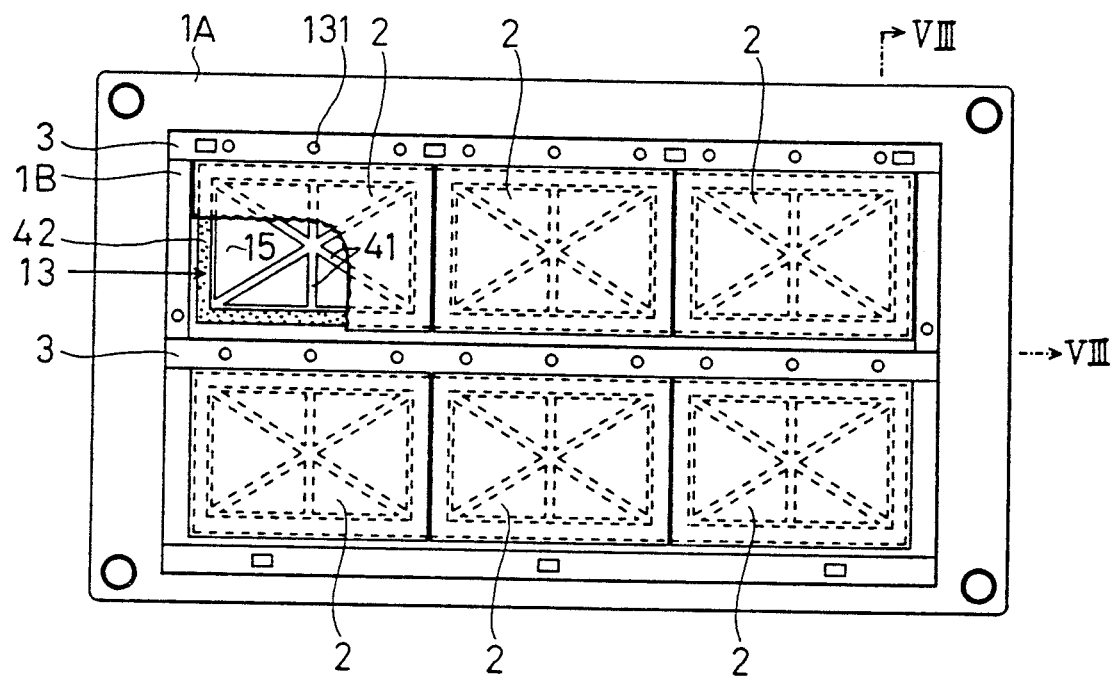
FIG. 14 is a front elevation showing a ventilation system according to a fourth embodiment of the present invention.
Figure 15:
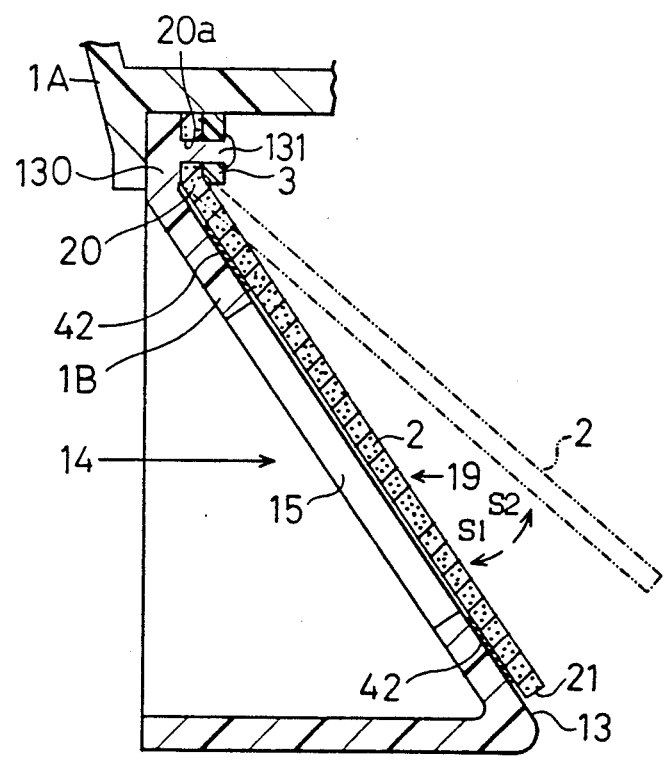
FIG. 15 is a section taken along line XV—XV of FIG. 14.
Figure 16:
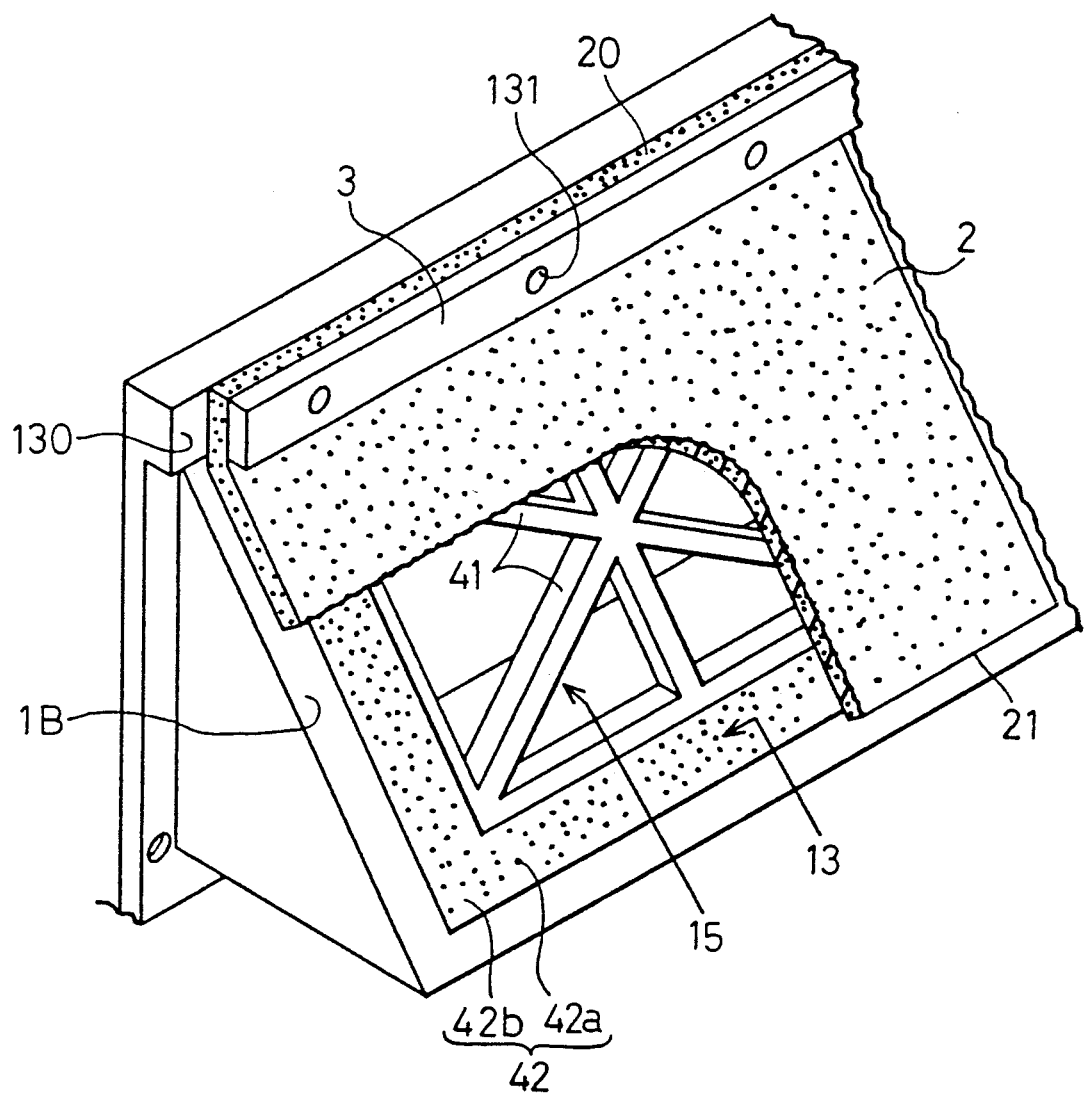
FIG. 16 is a perspective view showing an essential portion of the ventilation system according to a fourth embodiment of the present invention.

Next, in the ventilation system according to the fourth embodiment, as shown in FIGS. 14 to 16, the four sides of the peripheral edge 13 of the inside air outlet 15 of the mouth frame 1B is equipped with a magnetically attractive film 42 which is formed by applying a paint 42b containing magnetically attractive powder 42a of Soft Ferrite or the like to the upper, lower lefthand and righthand sides of the peripheral edge. In short, the magnetically attractive film 42 makes the magnetically attractive means.

On the other hand, the structure is similar to that of the first embodiment in that the rubber magnet forming the one-way valve 2 makes the permanent magnet means. The remaining structure is similar to that of the first embodiment, and the repetition of description will be omitted by designating the parts of FIGS. 14 to 16 at the same reference numerals as those of the first embodiment.

Figure 17:
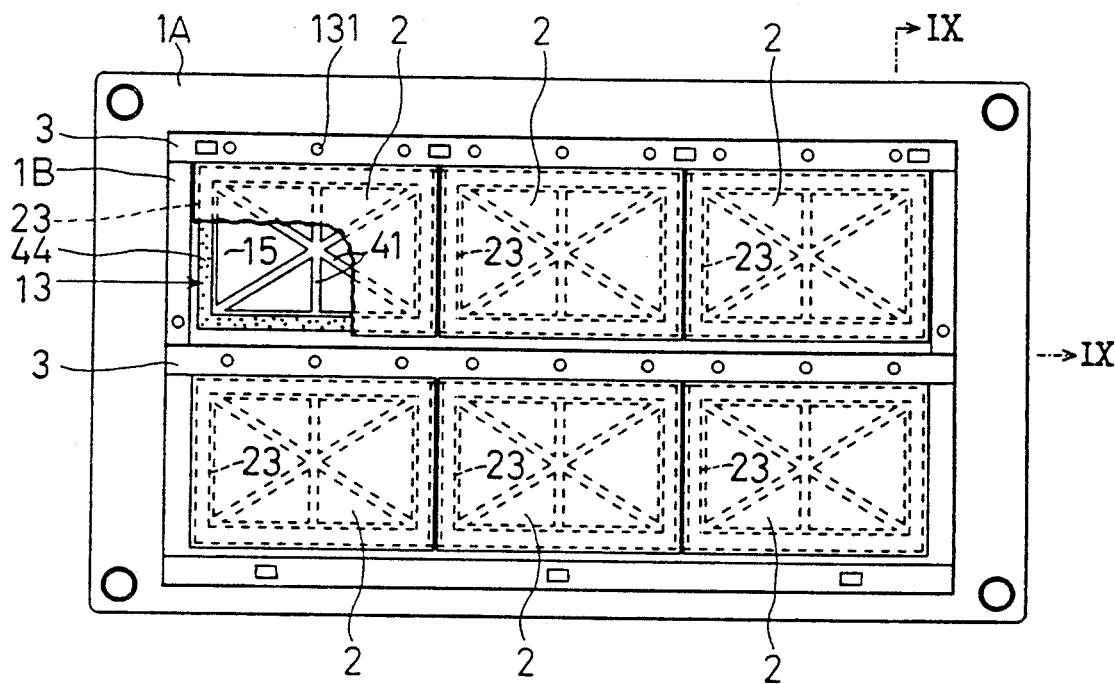
FIG. 17 is a front elevation showing a ventilation system according to a fifth embodiment of the present invention.
Figure 18:
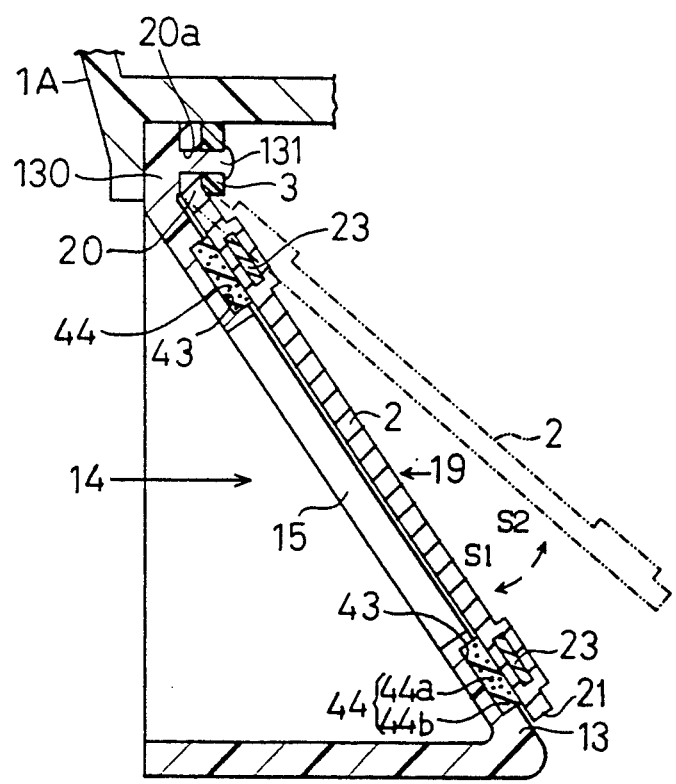
FIG. 18 is a section taken along line XVIII—XVIII of FIG. 17.
Figure 19:
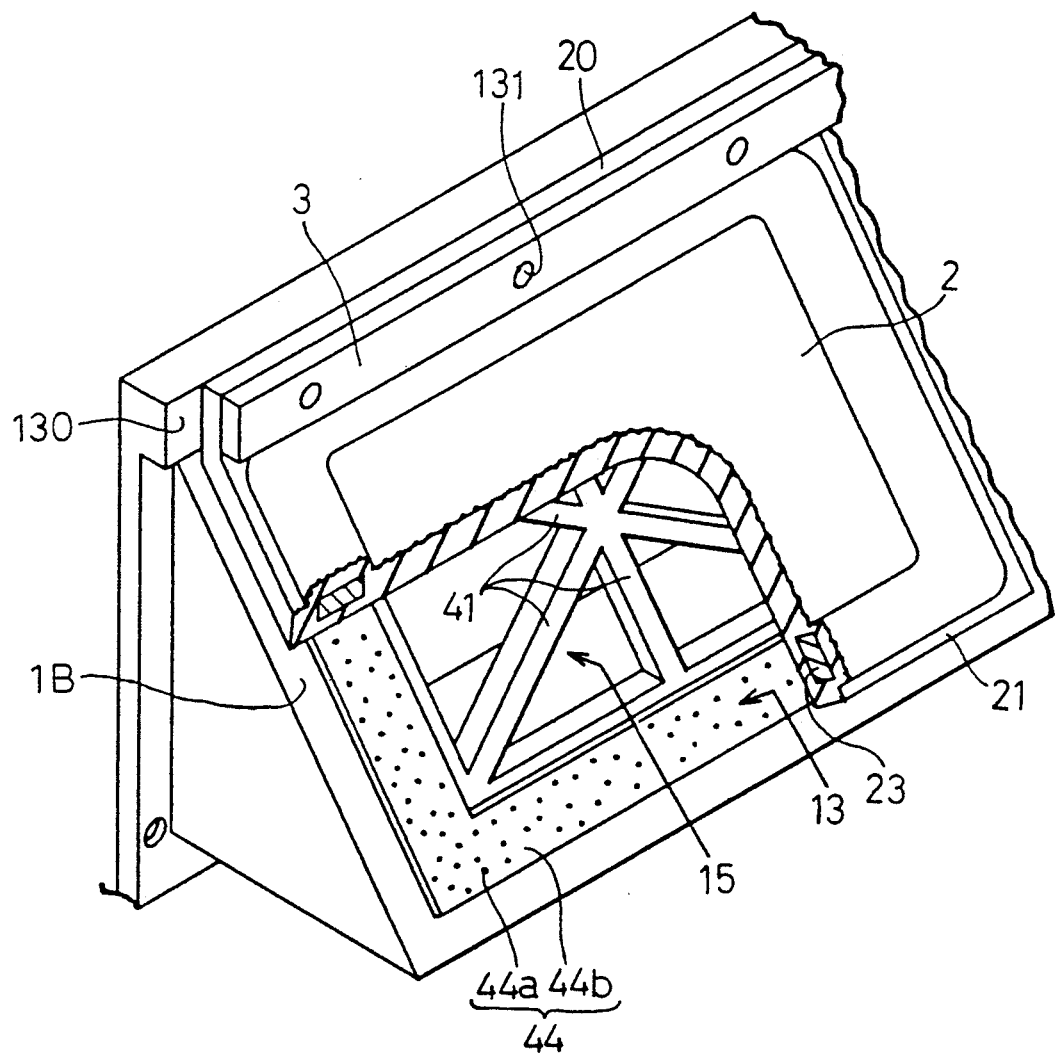
FIG. 19 is a perspective view showing an essential portion of the ventilation system of the fifth embodiment.

Next, in the ventilation system according to the fifth embodiment, as shown in FIGS. 17 to 19, the four sides, i.e., the upper, lower, lefthand and righthand sides of the peripheral edge 13 of the inside air outlet 15 of the mouth frame 1B are formed with rectangularly framed engagement grooves 43. A similarly framed permanent magnet member 44 is engaged with and adhered to those engagement grooves 43 so that the one-way valve 2 is adapted to come into abutment against the exposed faces of those permanent magnet members 44. In short, these permanent magnet members 44 make the permanent magnet means. The permanent magnet members 44 are formed by combining thin tapes which are made of rubber 44b such as chloroprene rubber containing 10 to 60 vol. % of permanent magnet powder 44a (produced under the trade No. FS-317 by Toda Industrial Co., Ltd.) of Hard Ferrite having a particle diameter of 60 to 80 μm, for example. Despite of this fact, however, the permanent magnet members can be integrally molded of the above-specified material.

On the other hand, the one-way valve 2 is formed of rubber such as chloroprene rubber. In the abutting portion of the one-way valve 2 against the aforementioned peripheral edge 13, there is buried a rectangularly framed magnetically attractive member 23 by inserting it at the molding time of said one-way valve 2. In short, this magnetically attractive member 23 makes the magnetically attractive means. The magnetically attractive member 23 is formed by punching a thin film made of ferrite stainless steel (JIS SUS430-MT) and having a thickness of about 0.5 mm. However, the magnetically attractive member 23 can be formed by combining the thin foils. Incidentally, the remaining structure is similar to that of the first embodiment, and the repetition of description will be omitted by designating the parts of FIGS. 17 to 19 at the same reference numerals as those of the first embodiment.

Figure 20:
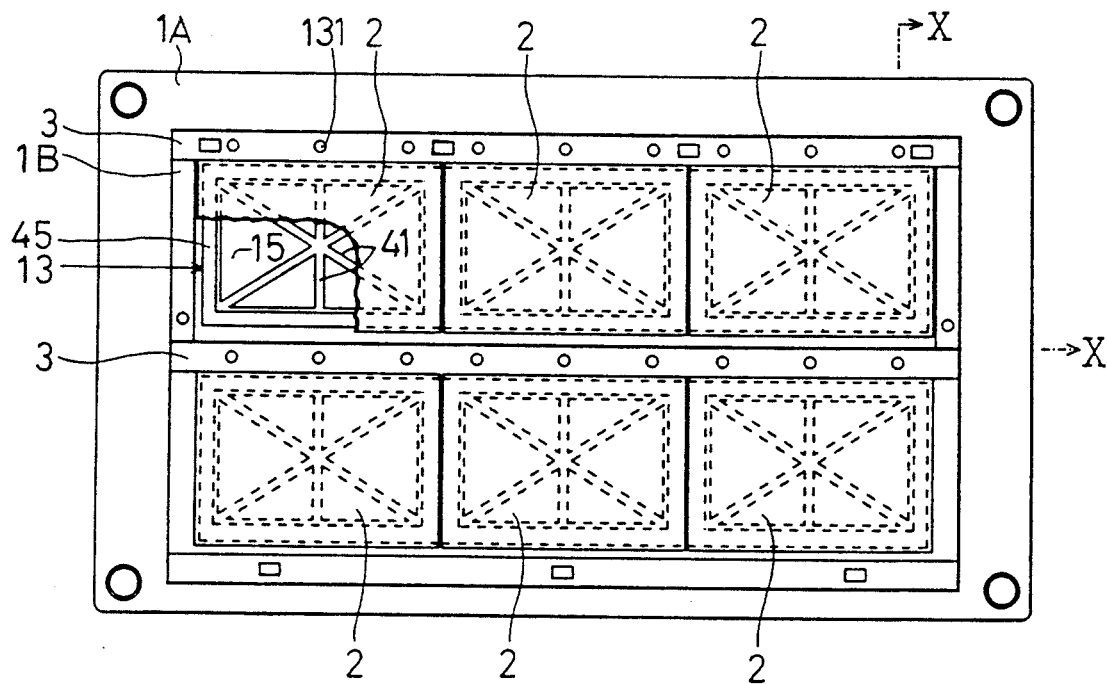
FIG. 20 is a front elevation showing a ventilation system according to a sixth embodiment of the present invention.
Figure 21:
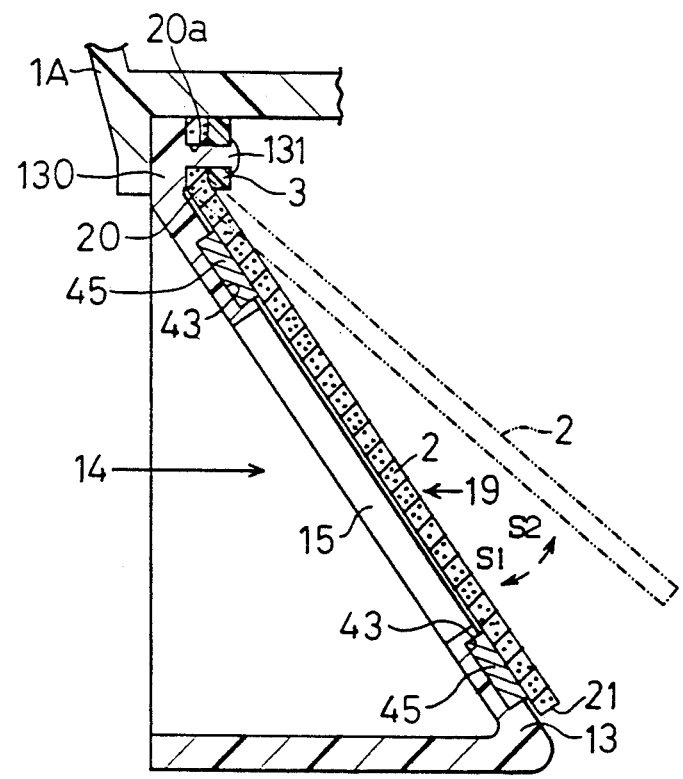
FIG. 21 is a section taken along line XXI—XXI of FIG. 20.
Figure 22:
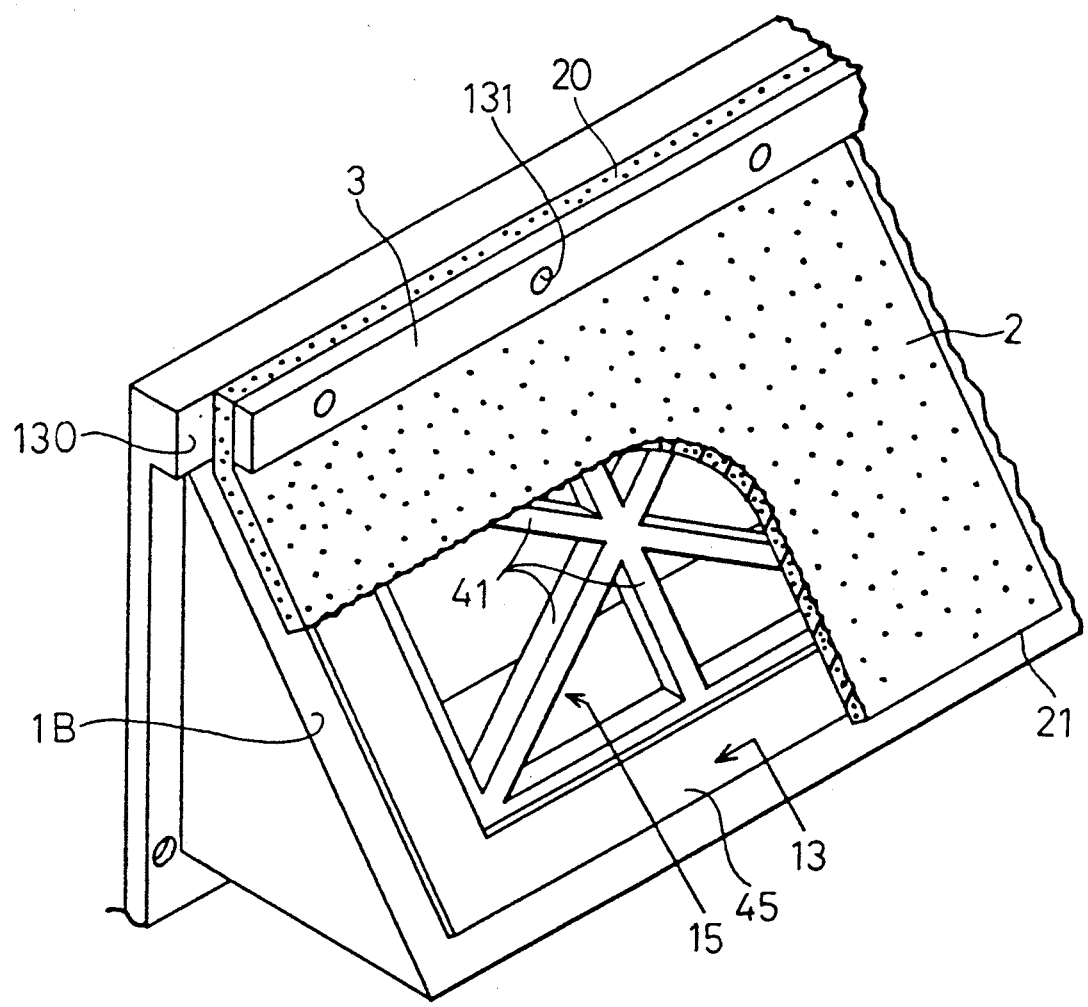
FIG. 22 is a perspective view showing an essential portion of the ventilation system of the sixth embodiment.

Next, in the ventilation system according to the sixth embodiment, as shown in FIGS. 20 to 22, the peripheral edge 13 of the inside air outlet 15 of the mouth frame 1B is formed with rectangularly framed engagement grooves 43 which are similar to those of the fifth embodiment. A similarly framed permanent magnet member 45 is engaged with and adhered to those engagement grooves 43 so that the one-way valve 2 are adapted to come into abutment against the exposed faces of the permanent magnet member 45. In short, this permanent magnet member 45 makes the permanent magnet means. The permanent magnet member 45 is integrally molded of barium ferrite but can be formed by combining thin foils of barium ferrite.

On the other hand, the structure is similar to that of the first embodiment in that the rubber magnet forming the one-way valve 2 makes the permanent magnet means. In this mode, specifically, the permanent magnet means attracts the permanent magnet means of the aforementioned mouth frame 1B to each other. Incidentally, the remaining structure is similar to that of the first embodiment, and the repetition of description will be omitted by designating the parts of FIGS. 20 to 22 at the same reference numerals as those of the first embodiment.

Next, modifications of the components of the foregoing individual embodiments will be exemplified in the following.

The mouth frame 1B may be equipped with at least the inside air outlet 15 and the peripheral edge 13 and may have the following other members (1) to (4), for example:

(1) A mounting member for mounting the mouth frame 1B on a mounting place (e.g., the body A of a car) of the ventilation system is additionally formed integrally with the mouth frame A;

(2) The aforementioned mounting member (1) is additionally formed as a part separately of the mouth frame 1B, as exemplified by the flange base of each of the foregoing embodiments;

(3) Either an inside air introducing duct for sucking and introducing the inside air 14 to the inside air outlet 15 or an inside air releasing duct for releasing the inside air 14 from the inside air outlet 15 to the outside of the compartment is additionally formed integrally with the mouth frame 1B; and (4) The inside air introducing duct or inside air releasing duct (3) is additionally formed separately of the mouth frame 1B, as exemplified by the inside air introducing duct 1A of the foregoing embodiment.

The inside air outlet 15 of the mouth frame 1B can be suitably shaped rectangular, triangular or circular, if necessary. Likewise, the number and opening area of the inside air inlet 15 can be suitably set, if necessary.

The "permanent magnet means" or "magnetically attractive means" to be attached to the mouth frame 1B may be disposed in the peripheral edge 13 of the aforementioned inside air outlet 15 and includes not only the structure, in which it is disposed all over the peripheral edge 13, but also the structure in which it is disposed partially in the peripheral edge 13. If the inside air outlet 15 is rectangular, for example, the permanent magnet means or the magnetically attractive means may be exemplified by the structure, in which it is formed into a rectangular frame in the entirety of the peripheral edge 13, in which it is formed in the shape of Japanese letter " " in the three sides of the peripheral edge 13, in which it is formed in parallel or in the shape of letter "L" in the two sides of the peripheral edge 13, or in which it is formed in one side of the peripheral edge 13. This "permanent magnet means" to be attached to the mouth frame 1B can be exemplified by the following (A) to (G):

(A) The mouth frame 1B is made in its entirety of a permanent magnet material such as ① Alunico, an alloy of iron-chromium-cobalt, or an alloy of manganese-aluminum-carbon, ② a metallic oxide such as hard ferrite (i.e., a hard magnetic ferrite such a barium ferrite or strontium ferrite), or ③ an intermetallic compound such as a rare earth metal cobalt. The magnetization of the permanent magnet means may be performed before or after the mouth frame 1B is formed;

(B) The mouth frame 1B is molded in its entirety of a high-molecular material (e.g., a synthetic resin or rubber) containing permanent magnet powder such as the aforementioned alloy, metallic oxide or intermetallic compound. This permanent magent means is magnetized after the mouth frame 1B has been molded;

(C) The mouth frame 1B is subjected to a simultaneous molding (i.e., the so-called "two-color molding") by molding the peripheral edge 13 of a high-molecular material containing the permanent magnet powder of the aforementioned alloy, metallic oxide or intermetallic compound and by molding the other portions of a high-molecular material containing none of the permanent magnet powder. This permanent magnet means is magnetized after the molding of the mouth frame 1B;

(D) When the mouth frame 1B is to be molded of a high-molecular material, a permanent magnet member made of the aforementioned alloy, metallic oxide or intermetallic compound is inserted into the peripheral edge 13. This permanent magnet means is magnetized before or after the molding of the mouth frame 1B;

(E) To the peripheral edge 13 of the mouth frame 1B made of a high-molecular material or the like, there is attached a permanent magnet member, which is made of a high-molecular material containing permanent magnet powder made of the aforementioned alloy, metallic oxide or intermetallic compound, by adhering it by means of an adhesive or by fitting it in an engagement groove formed in said peripheral edge 13. This permanent magnet means is magnetized before or after the mounting on the mouth frame 1B;

(F) To the peripheral edge 13 of the mouth frame 1B made of a high-molecular material or the like, there is attached a permanent magnet member, which is made of the aforementioned alloy, metallic oxide or intermetallic compound, by adhering it by means of an adhesive or by fitting it in an engagement groove formed in said peripheral edge 13. This permanent magnet means is exemplified by the permanent magnet member 45 of the foregoing sixth embodiment and is magnetized before or after the mounting on the mouth frame 1B; and (G) The peripheral edge 13 of the mouth frame 1B made of a high-molecular material or the like is formed with a permanent magnet film which is made of the aforementioned alloy, metallic oxide or intermetallic compound. The method of forming this permanent magnet film can be exemplified by ① a method of applying a paint containing permanent magnet powder made of the aforementioned alloy, metallic oxide or intermetallic compound or ② a method of plating, flame spraying, physical vapor depositing or chemical vapor depositing a permanent magnet material made of the aforementioned alloy, metallic oxide or intermetallic compound. This permanent magnet means is magnetized after forming it on the mouth frame 1B.

On the other hand, the "magnetically attractive means" to be attached to the mouth frame 1B can be exemplified by the following (a) to (g):

(a) The mouth frame 1B is wholly formed of a magnetically attractive material made of ① a metal such as iron, cobalt, nickel or a rare earth metal, ② an alloy such as silicon steel containing these metals or not, permalloy or an amorphous alloy, ③ a metallic oxide such as soft ferrite (or soft magnetic ferrite), or ④ an intermetallic compound;

(b) The mouth frame 1B is wholly molded of a synthetic resin or rubber containing magnetically attractive powder composed of the aforementioned metal, alloy, metallic compound or intermetallic compound. This is exemplified by the magnetically attractive means of the foregoing first or third embodiment;

(c) The mouth frame 1B is subjected to the simultaneous molding (i.e., the so-called "two-color molding") by having its peripheral edge 13 molded of a high-molecular material containing magnetically attractive powder of the aforementioned metal, alloy, metallic oxide or intermatallic compound and its other portions molded of a high-molecular material containing no magnetically attractive powder;

(d) When the mouth frame 1B is to be molded of a high-molecular material, a magnetically attractive member of the aforementioned metal, alloy, metallic oxide or intermetallic compound is inserted into the peripheral edge 13 of the mouth frame 1B;

(e) A magnetically attractive member made of a high-molecular material containing magnetically attractive powder of the aforementioned metal, alloy, metallic oxide or intermetallic compound is attached to the peripheral edge 13 of the mouth frame 1B made of a high-molecular material or the like, by adhering it by means of an adhesive or by fitting it in an engagement groove formed in said peripheral edge 13;

(f) A magnetically attractive member made of the aforementioned metal, alloy, metallic oxide or intermetallic compound is attached to the peripheral edge 13 of the mouth frame 1B made of a high-molecular material or the like, by adhering it by means of an adhesive or by fitting it in an engagement groove formed in said peripheral edge 13. This is exemplified by the magnetically attractive member 40 of the foregoing second embodiment; and (g) The peripheral edge 13 of the mouth frame 1B made of a high-molecular material or the like is formed with a magnetically attractive film made of the aforementioned metal, alloy, metallic oxide or intermetallic compound. The method of forming this magnetically attractive film can be exemplified by: ① the method of applying a paint containing the magnetically attractive powder of the aforementioned metal, alloy, metallic oxide or intermetallic compound; or ② the method of plating, flame-spraying, or physical or chemical vapor depositing the magnetically attractive material of the aforementioned metal, alloy, metallic oxide or intermetallic oxide. This is exemplified by the magnetically attractive film 42 of the foregoing fourth embodiment.

Next, the one-way valve may preferably have a specific gravity of 1.3 to 3.5 (more preferably 1.5 to 3.0).

As the moving structure of the one-way valve 2, there can be adopted a structure in which a portion for providing a fulcrum for movement of the one-way valve 2 is made of a separate hinge member. This hinge member to be used can be exemplified by a support pin and a support pipe, which are rotatably fitted the former in the latter.

The "permanent magnet means" or "magnetically attractive means" to be attached to the one-way valve 2 may be disposed in the abutment portion against the peripheral edge 13 and includes not only the structure, in which it is disposed all over the abutment portion, but also the structure in which it is disposed partially in the abutment portion. If the permanent magnet means or magnetically attractive means abuts against the peripheral edge 13 of the rectangular inside air outlet 15, for example, the permanent magnet means or the magnetically attractive means may be exemplified by the structure, in which it is formed into a rectangular frame in the entirety of the abutment portion, in which it is formed in the shape of Japanese letter " " in the three sides of the abutment portion, in which it is formed in parallel or in the shape of letter "L" in the two sides of the abutment portion, or in which it is formed in one side of the abutment portion.

This "permanent magnet means" to be attached to the one-way valve 2 can be exemplified by the following (A) to (G):

(A) The one-way valve 2 is made in its entirety of a permanent magnet material such as ① Alunico, an alloy of iron-chromium-cobalt, or an alloy of manganese-aluminum-carbon, ② a metallic oxide such as hard ferrite (i.e., a hard magnetic ferrite such a barium ferrite or strontium ferrite), or ③ an intermetallic compound such as a rare earth metal cobalt. The magnetization of the permanent magnet means may be performed before or after the one-way valve 2 is formed;

(B) The one-way valve 2 is molded in its entirety of a high-molecular material (e.g., a synthetic resin or rubber) containing permanent magnet powder such as the aforementioned alloy, metallic oxide or intermetallic compound. This permanent magnet means is magnetized after the one-way valve 2 has been molded;

(C) The one-way valve 2 is subjected to a simultaneous molding (i.e., the so-called "two-color molding") by molding its abutment portion against the peripheral edge 13 of a high-molecular material containing the permanent magnet powder of the aforementioned alloy, metallic oxide or intermetallic compound and by molding the other portions of a high-molecular material containing none of the permanent magnet powder. This permanent magnet means is magnetized after the molding of the one-way valve 2;

(D) When the one-way valve 2 is to be molded of a high-molecular material, a permanent magnet member made of the aforementioned alloy, metallic oxide or intermetallic compound is inserted into the abutment portion. This permanent magnet means is magnetized before or after the molding of the one-way valve 2;

(E) To the abutment portion of the one-way valve 2 made of a high-molecular material or the like, there is attached a permanent magnet member, which is made of a high-molecular material containing permanent magnet powder made of the aforementioned alloy, metallic oxide or intermetallic compound, by adhering it by means of an adhesive or by fitting it in an engagement groove formed in said abutment portion. This permanent magnet means is magnetized before or after the mounting on the one-way valve 2;

(F) To the abutment portion of the one-way valve 2 made of a high-molecular material or the like, there is attached a permanent magnet member, which is made of the aforementioned alloy, metallic oxide or intermetallic compound, by adhering it by means of an adhesive or by fitting it in an engagement groove formed in said abutment portion. This permanent magnet means is exemplified by the permanent magnet member 22 of the foregoing third embodiment and is magnetized before or after the mounting on the one-way valve 2; and (G) The abutment portion of the one-way valve 1B made of a high-molecular material or the like is formed with a permanent magnet film which is made of the aforementioned alloy, metallic oxide or intermetallic compound. The method of forming this permanent magnet film can be exemplified by ① a method of applying a paint containing permanent magnet powder made of the aforementioned alloy, metallic oxide or intermetallic compound or ② a method of plating, flame spraying, physical vapor depositing or chemical vapor depositing a permanent magnet material made of the aforementioned alloy, metallic oxide or intermetallic compound. This permanent magnet means is magnetized after forming it on the one-way valve 2.

The "magnetically attractive means" to be attached to the one-way valve 2 can be exemplified by the following (a) to (g):

(a) The one-way valve 2 is wholly formed of a magnetically attractive material made of ① a metal such as iron, cobalt, nickel or a rare earth metal, ② an alloy such as silicon steel containing these metals or not, permalloy or an amorphous alloy, ③ a metallic oxide such as soft ferrite (or soft magnetic ferrite), or ④ an intermetallic compound;

(b) The one-way valve 2 is wholly molded of a synthetic resin or rubber containing magnetically attractive powder composed of the aforementioned metal, alloy, metallic compound or intermetallic compound;

(c) The one-way valve 2 is subjected to the simultaneous molding (i.e., the so-called "two-color molding") by having its abutment portion against the aforementioned peripheral edge 13 molded of a high-molecular material containing magnetically attractive powder of the aforementioned metal, alloy, metallic oxide or intermetallic compound and its other portions molded of a high-molecular material containing no magnetically attractive powder;

(d) When the one-way valve 2 is to be molded of a high-molecular material, a magnetically attractive member of the aforementioned metal, alloy, metallic oxide or intermetallic compound is inserted into the abutment portion of the one-way valve 2;

(e) A magnetically attractive member made of a high-molecular material containing magnetically attractive powder of the aforementioned metal, alloy, metallic oxide or intermetallic compound is attached to the abutment portion of the one-way valve 2 made of a high-molecular material or the like, by adhering it by means of an adhesive or by fitting it in an engagement groove formed in said abutment portion;

(f) A magnetically attractive member made of the aforementioned metal, alloy, metallic oxide or intermetallic compound is attached to the peripheral edge 13 of the mouth frame 1B made of a high-molecular material or the like, by adhering it by means of an adhesive or by fitting it in an engagement groove formed in said peripheral edge 13; and (g) The abutment portion of the one-way valve 2 made of a high-molecular material or the like is formed with a magnetically attractive film made of the aforementioned metal, alloy, metallic oxide or intermetallic compound. The method of forming this magnetically attractive film can be exemplified by: ① the method of applying a paint containing the magnetically attractive powder of the aforementioned metal, alloy, metallic oxide or intermetallic compound; or ② the method of plating, flame-spraying, or physical or chemical vapor depositing the magnetically attractive material of the aforementioned metal, alloy, metallic oxide or intermetallic oxide.

Incidentally, in the structure using the permanent magnet powder or magnetically attractive powder of each of the above-specified examples, the content of the permanent magnet powder or magnetically attractive powder in the high-molecular material or paint can be selected from a range of 1 to 6 g/$^3$, i.e., 10 to 80 vol. % (more perferably, 20 to 60 vol. %). Moreover, the permanent magnet powder or magnetically attractive powder can have its particle diameter selected from the range of 0.1 to 100 μm.

The above-specified examples (A) to (G) of the permanent magnet means or (a) to (g) of the magnetically attractive means to be attached to the mouth frame 1B and the above-specified examples (A) to (G) of the permanent magnet means or (a) to (g) of the magnetically attractive means to be attached to the one-way valve 2 can be combined in any manner excepting the mutual combination of the magnetically attractive means.

On the other hand, the magnetically attracting force between the aforementioned mouth frame 1B and one-way valve 2 may preferably be set within the suitable range of 0.2 to 10 g/cm$^2$. This is partly because, if the magnetically attracting force is so strong as to exceed said range, the one-way valve 2 is not be swung by the action of the aforementioned vacuum to be established at the running of the car, for example, so that it cannot open the inside air outlet 15, and partly because, if the magnetically attracting force is so weak as to fail to fall within said range, the one-way valve 2 is swung to open the inside air outlet 15 unpreparedly only by the vibrations to be caused at the car running, for example. Thus, the suitable magnetic force of the permanent magnet means to be attached to the mouth frame 1B or the one-way valve 2 is 30 to 2,000 Gausses (more preferably, 100 to 200 Gausses).

Since the present invention can apparently constitute a wide range of various modes of embodiment without departing from the spirit and scope thereof, it should not be limited to the modes of embodiment, excepting that it is defined by the appended claims.

What is claimed is:

1. A ventilation system comprising:
   a mouth frame including an inside air outlet for releasing the inside air of a compartment to the outside;
   a high-molecular material containing magnetically attractive powder forming at least the peripheral edge of said inside air outlet; and
   a one-way valve for closing said inside air outlet at times other than the time of releasing the inside air of the compartment to the outside, and for opening said inside air outlet only in the releasing direction at the time of releasing the inside air of said compartment to the outside,
   said one-way valve including permanent magnet means for attracting said magnetically attractive powder of said inside air outlet, permitting said peripheral edge to abut a portion of said one-way valve.

2. A ventilation system according to claim 1, wherein the magnetically attractive powder of said mouth frame and the permanent magnet means of said one-way valve have their magnetically attracting force set to 0.2 to 10 g/cm$^2$.

3. A ventilation system according to claim 1, wherein the permanent magnet material of said one-way valve is a high-molecular means containing permanent magnet powder.

4. A ventilation system according to claim 1, wherein said high-molecular material contains permanent magnetic powder.

* * * * *